(12) United States Patent
Anzel

(10) Patent No.: US 6,435,457 B1
(45) Date of Patent: Aug. 20, 2002

(54) THRUSTER SYSTEMS FOR SPACECRAFT STATION CHANGING, STATION KEEPING AND MOMENTUM DUMPING

(75) Inventor: Bernard M. Anzel, El Segundo, CA (US)

(73) Assignee: The Boeing Company, Irvine, CA (US)

( * ) Notice: Subject to any disclaimer, the term of this patent is extended or adjusted under 35 U.S.C. 154(b) by 2 days.

(21) Appl. No.: 09/769,936

(22) Filed: Jan. 25, 2001

(51) Int. Cl.[7] .................................................. B64G 1/26
(52) U.S. Cl. ........................................ 244/169; 244/172
(58) Field of Search ................................ 244/169, 172, 244/158 R, 164

(56) References Cited

U.S. PATENT DOCUMENTS

| | | | |
|---|---|---|---|
| 4,635,885 A | * | 1/1987 | Hujsak |
| 4,786,019 A | * | 11/1988 | Uken |
| 5,443,231 A | | 8/1995 | Anzel .......................... 244/164 |
| 5,458,300 A | * | 10/1995 | Flament et al. |
| 5,806,804 A | * | 9/1998 | Goodzeit et al. |
| 5,810,295 A | * | 9/1998 | Anzel |
| 5,813,633 A | | 9/1998 | Anzel .......................... 244/169 |
| 6,015,116 A | * | 1/2000 | Anzel et al. |
| 6,042,058 A | | 3/2000 | Anzel .......................... 244/164 |
| 6,213,432 B1 | * | 4/2001 | Koppel |

* cited by examiner

Primary Examiner—Charles T. Jordan
Assistant Examiner—T. Dinh
(74) Attorney, Agent, or Firm—Terje Gudmestad

(57) ABSTRACT

Spacecraft thruster systems are provided that can realize station changing, station keeping and momentum dumping in spacecraft while minimizing loss of spacecraft service time. The systems are formed with pairs of E and W thrusters, NE and SE thrusters and NW and SW thrusters whose thrust directions are each defined by respective polar angles φ and slew angles α. The E and W thrusters are especially suited for rapid station changing while the remaining thrusters generate normal, tangential and radial thrust components required for station keeping. Because all thrusters are directed through the spacecraft's center of mass during station changing and station keeping firings, the spacecraft's attitude is not disturbed and loss of service time is avoided. The thrusters are preferably gimbaled so that they can track spatial changes of the spacecraft's center of mass or, for momentum dumping, be offset from that center of mass. The normal tangential and radial thrust components of the thruster systems are arranged so that station changing, station keeping and momentum dumping are still realized after the failure of any thruster pair.

28 Claims, 4 Drawing Sheets

THRUSTER SYSTEMS FOR SPACECRAFT STATION CHANGING, STATION KEEPING AND MOMENTUM DUMPING

GOVERNMENT RIGHTS

This invention was made with government support under Contract No. F04701-99-C-0028 awarded by the Department of the Air Force. The government has certain rights in this invention.

BACKGROUND OF THE INVENTION

1. Field of the Invention

The present invention relates generally to spacecraft and, more particularly, to orbital control of spacecraft.

2. Description of the Related Art

FIG. 1 illustrates a spacecraft 20 in a synchronous orbit 22 (e.g., a geostationary orbit) which defines an orbital plane 24. In order to perform its designed service, the spacecraft 20 is typically required to maintain a controlled spatial relationship with the earth 26.

This relationship is generally fixed with the aid of a station-keeping box 28 which has predetermined dimensions that define the maximum permitted excursions of the spacecraft 20 (particularly in longitude and latitude). The dimensions are determined by various operational and service considerations (e.g., beamwidth of spacecraft antennas, ground station tracking capabilities and specified interference limits between the spacecraft 20 and its neighbor spacecraft) and is on the order of 0.2° longitude and latitude (i.e., ~75 kilometers) for spacecraft which use regulated communication frequency bands.

Many spacecraft are restrained to a corresponding station-keeping box for their entire service life but service demands (e.g., military and commercial objectives) of others require that they also be capable of station changing, i.e., they must move from an initial box such as the station-keeping box 28 to one or more subsequent boxes such as the station-keeping box 30. The initial and subsequent boxes are separated by a longitude 32 which may be of considerable magnitude.

In order to carry out its intended service, the spacecraft 20 must also maintain a predetermined service attitude such as one in which antennas of the spacecraft 20 are directed at respective service areas on the earth 26 (e.g., along an antenna boresight 33). Disturbance of the service attitude causes interruption of service and avoiding the loss of expensive service time is a prime objective in the operation of spacecraft.

Although current thruster systems are generally effective for performing spacecraft stationkeeping and attitude control, they are generally less suited for spacecraft station changing. For the latter function, some systems employ high-thrust chemical engines (e.g., bipropellant thrusters) which can effect station changing in acceptable time spans. However, sufficient fuel must be carried by the spacecraft for these high-thrust engines and this reduces the spacecraft's payload.

Other systems employ low-thrust engines (e.g., ion thrusters) which can operate on electrical energy that is supplied by the spacecraft's solar cell arrays. In order to effect station changing in acceptable time spans, however, the spacecraft's attitude must typically be disturbed in order to more effectively align these low-thrust engines and this attitude disturbance causes loss of service time.

Current thruster systems, therefore, generally fail to effectively meet the combined demands of station changing, station keeping, momentum dumping and service-loss minimization.

SUMMARY OF THE INVENTION

The present invention is directed to thruster systems that can realize station changing, station keeping and. momentum dumping in spacecraft while minimizing any loss of spacecraft service time. These goals are realized with pairs of E and W thrusters, NE and SE thrusters and NW and SW thrusters whose thrust directions are each defined by respective polar angles $\phi$ and slew angles $\alpha$.

The E and W thrusters are especially suited for rapid station changing while the remaining thrusters generate normal, tangential and radial thrust components required for station keeping. Because all thrusters are directed through the spacecraft's center of mass during station changing and station keeping firings, the spacecraft's attitude is not disturbed and loss of service time is avoided. The thrusters are preferably gimbaled so that they can track spatial changes of the spacecraft's center of mass or, for momentum dumping, be offset from that center of mass. The normal, tangential and radial thrust components of the thruster systems are arranged so that station changing, station keeping and momentum dumping are still realized after the failure of any thruster pair.

Different thruster embodiments are provided whose slew angles are rotated respectively from anti-nadir and nadir portions of the spacecraft's yaw axis. Although these systems can be realized with various thruster types, they are particularly suited for ion thrusters.

The novel features of the invention are set forth with particularity in the appended claims. The invention will be best understood from the following description when read in conjunction with the accompanying drawings. dr

DETAILED DESCRIPTION OF THE PREFERRED EMBODIMENTS

Figure 2:
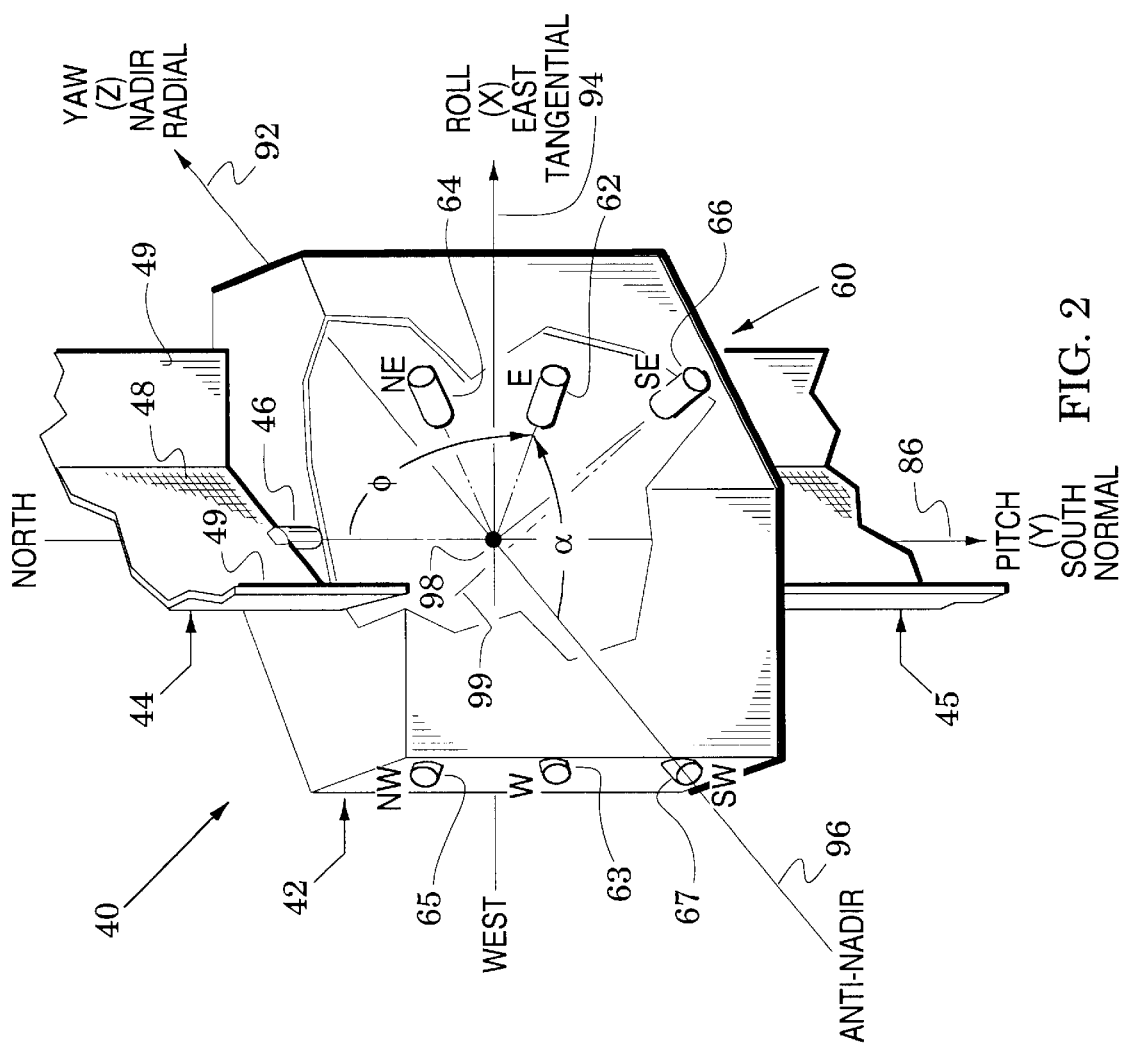
FIG. 2 is a perspective view of a spacecraft and thruster system of the present invention.
Figure 3B:
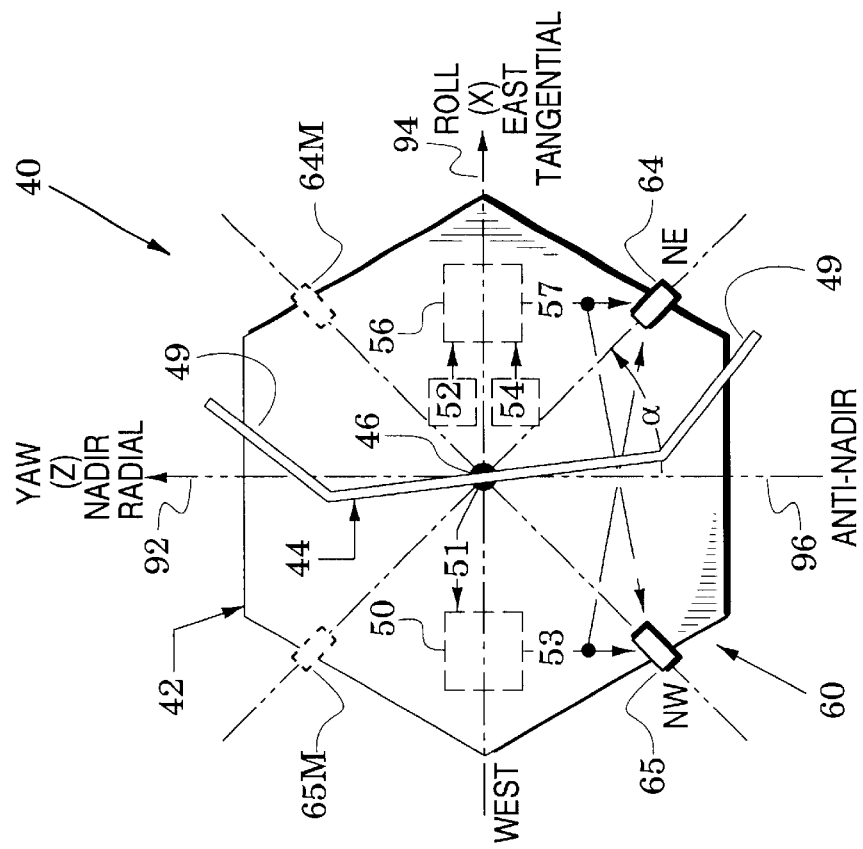
FIGS. 3A and 3B are views respectively of the anti-nadir and top sides of the spacecraft and thruster system of FIG. 2.
Figure 3A:
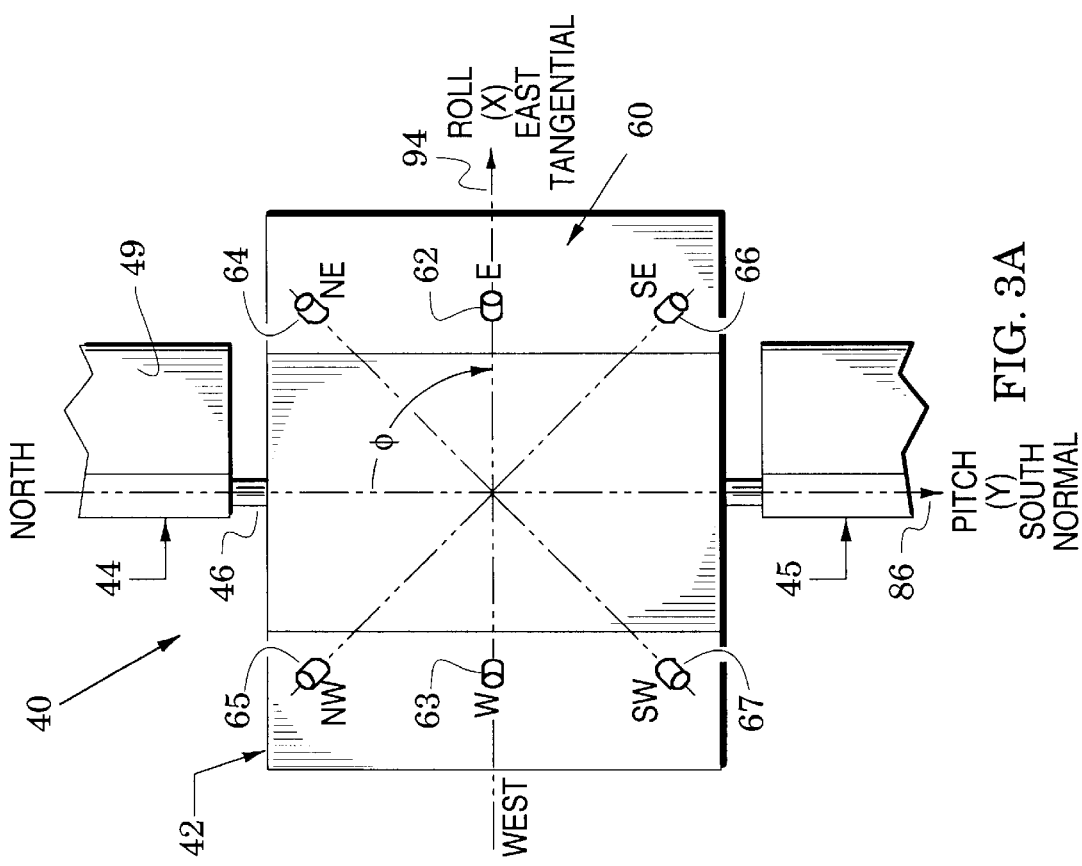

FIGS. 2, 3A and 3B illustrate spacecraft and thruster systems of the present invention. The thruster systems effectively realize spacecraft station changing, station keeping and momentum dumping processes. In addition, they do not disturb the spacecraft service attitude during these processes and thereby, they prevent loss of valuable service time. The systems effect these processes even in the event of a variety of failure modes.

In particular, the spacecraft 40 of FIGS. 2, 3A and 3B includes a body 42 and solar wings 44 and 45 which are rotatably coupled to the body by shaft members 46. Each of the solar wings carries a solar cell array 48 and a pair of concentrators 49 which are angled with respect to the array to thereby reflect additional sun light onto the array and enhance its generation of electrical current. Although the body 42 is shown to be in the exemplary form of a hexagonal polyhedron, spacecraft bodies generally have a variety of different shapes.

To facilitate operation of the thruster system 60, the spacecraft also carries (see FIG. 3B) a power supply system 50, at least one gyroscope 52, at least one attitude sensor 54 (e.g., a sun tracker, earth sensor and/or star tracker) and a thruster controller 56. The power supply system 50 receives electrical current 51 from the solar cell arrays (48 in FIG. 2) and, in response, supplies power 53 to the thruster system 60. The controller 56 receives rotation and attitude signals from the gyroscope 52 and sensor 54 and, in response, applies thrust command signals 57 to activate thrusters of the thruster system 60.

Figure 4:
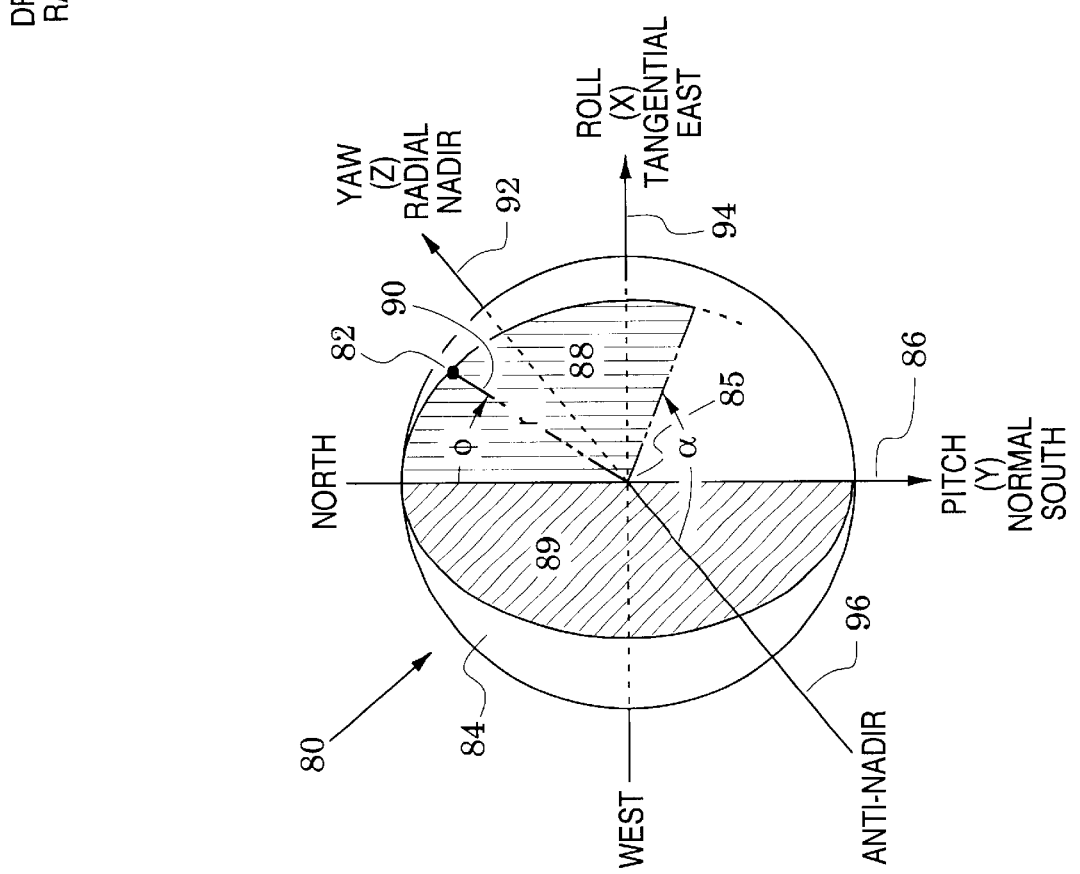
FIG. 4 is a perspective view which illustrates spherical coordinates of FIGS. 2, 3A and 3B.

In order to enhance and clarify a description of the thruster system 60, attention is initially directed to FIG. 4 which shows a spherical coordinate system 80. Spherical coordinates are particularly suited for locating a point 82 on the surface of a sphere 84 which has a center 85. The coordinates comprise a radius r of the sphere 84, secondly, an angle φ formed by the point 82, the center 85 and a given axis 86 of the sphere and, thirdly, an angle α between the plane 88 of the angle φ and a reference plane 89 of the sphere 84. Spherical coordinates are shown in a variety of references (e.g., see *Merriam-Webster's Collegiate Dictionary*, Springfield, Mass., tenth edition, 1993).

The following thruster system descriptions will make extensive use of the spherical angles φ and α which will be respectively referred to as polar and slew angles. The descriptions have no need for the coordinate r but the line 90 that connects the point 82 and the center 85 will be used to represent axes of the invention's thrusters.

The axis 86 is directed downward and will be the pitch axis in descriptions of the invention's three-axis stabilized spacecraft. This axis is also conventionally referred to as the Y axis. An orthogonal axis 92 that is directed inward and lies in the plane 89 will be the spacecraft's yaw axis which is also conventionally referred to as the Z axis. A third axis 94 that is orthogonal to the axes 86 and 92 (and directed to the right in FIG. 4) will be the spacecraft's roll axis which is also conventionally referred to as the X axis.

For three-axis stabilized spacecraft in a geostationary orbit, the pitch axis 86 is directed to the south (away from the north), the yaw axis 92 is directed inward (nadir) towards the earth's center (away from the anti-nadir) and the roll axis 94 is directed to the east (away from the west). In terms of orbital coordinates, the pitch axis 86 is normal to the orbital plane (24 in FIG. 1) and the yaw axis 92 and roll axis 94 are respectively radial and tangential to the orbit (22 in FIG. 1). The following descriptions will also refer to the nadir (inward) portion of the yaw axis 92 and to the anti-nadir (outward) portion 96 of the yaw axis.

With the coordinate system 80 of FIG. 4 in hand, attention is returned to the spacecraft 40 and the thruster system 60 of FIGS. 2, 3A and 3B. The three-axis coordinate system is shown in association with the spacecraft with the pitch axis 86 coaxial with the solar wings 44 and 45 and the yaw and roll axes 92 and 94 through the body 42.

For orientation with the spherical angles of FIG. 4, exemplary polar and slew angles φ and α are shown in FIGS. 2, 3A and 3B to define the orientation of an east (E) thruster 62 of the thruster system 60. The polar angle φ is referenced to the pitch axis 86 and the slew angle α is referenced to the anti-nadir portion 96 of the yaw axis 92.

A second thruster 64 of the system 60 is a northeast (NE) thruster that is tilted southward from the pitch axis 86 by a NE polar angle that is less than 80° and rotated eastward from the anti-nadir portion 96 of the yaw axis by a NE slew angle that is less than 80°. A southeast (SE) thruster 66 is tilted northward from the pitch axis 86 by a SE polar angle that is less than 80° and rotated eastward from the anti-nadir portion 96 of the yaw axis by a SE slew angle that is less than 80°. The east (E) thruster is tilted southward from the pitch axis by an E polar angle that is sufficient to position the E thruster between the NE and SE thrusters and rotated eastward from the yaw axis by an E slew angle that is less than 80°.

A fourth thruster 65 of the system 60 is a northwest (NW) thruster 65 that is tilted southward from the pitch axis by a NW polar angle that is less than 80° and rotated westward from the anti-nadir portion 96 of the yaw axis by a NW slew angle that is less than 80°. A southwest (SW) thruster 65 is tilted northward from the pitch axis by a SW polar angle that is less than 80° and rotated westward from the anti-nadir portion 96 of the yaw axis by a SW slew angle that is less than 80°. Finally, a west (W) thruster 63 is tilted southward from the pitch axis by a W polar angle that is sufficient to position the W thruster between the NW and SW thrusters and rotated westward from the anti-nadir portion 96 of the yaw axis by a W slew angle that is less than 80°.

The NE, SE, NW and SW polar angles φ are preferably equal and are in a range (e.g., 40–65°) that is sufficient to cause the corresponding thrusters to generate significant normal, radial and tangential thrusts. The E and W polar angles φ are preferably substantially 90° so that their respective thrusters generate significant tangential thrusts.

The NE, SE, NW and SW slew angles α are preferably equal and are in a range (e.g., 30–50°) that is sufficient to cause the corresponding thrusters to generate significant tangential thrusts. The E and W slew angles α are preferably equal and are in a range (e.g., 30–90°) that is sufficient to cause the corresponding thrusters to generate significant tangential thrusts.

It is apparent that normal thrusts in the NE and NW thrusters oppose normal thrusts in the SE and SW thrusters, tangential thrusts in the NE and SE thrusters oppose tangential thrusts in the NW and SW thrusters and tangential thrusts in the E thruster oppose those of the W thruster.

Accordingly, the thruster system 60 of FIGS. 2, 3A and 3B can generate the station keeping east and west tangential thrusts required to correct spacecraft drift and orbit eccentricity, the station keeping north and south normal thrusts required to correct orbit plane inclination and the station keeping radial thrusts required to correct orbit eccentricity.

In particular, the tangential thrust components of the NE, SE, NW and SW thrusters are proportional to (sin φ)(sin α) and the tangential thrust components of the E and W thrusters are proportional to sin α when their polar angle is substantially 90°. The radial thrusts of the NE, SE, NW and SW thrusters are proportional to (sin φ)(cos α) and the radial thrust components of the E and W thrusters are proportional to cos α when their polar angle is substantially 90°. Finally, the normal thrust components of the NE, SE, NW and SW thrusters are proportional to (cos φ).

The E and W thrusters of FIGS. 2, 3A and 3B are especially suited for effecting station changes, i.e., longitude changes ΔL, for the spacecraft 40. In a thruster embodiment of the invention, the thrusters are ion thrusters (e.g., xenon ion thrusters) which operate on power that is generated from the electrical current of the solar cell arrays (48 in FIG. 2) and which, accordingly, can generate low thrust levels for long time periods (e.g., up to 24 hours each day).

Figure 1:
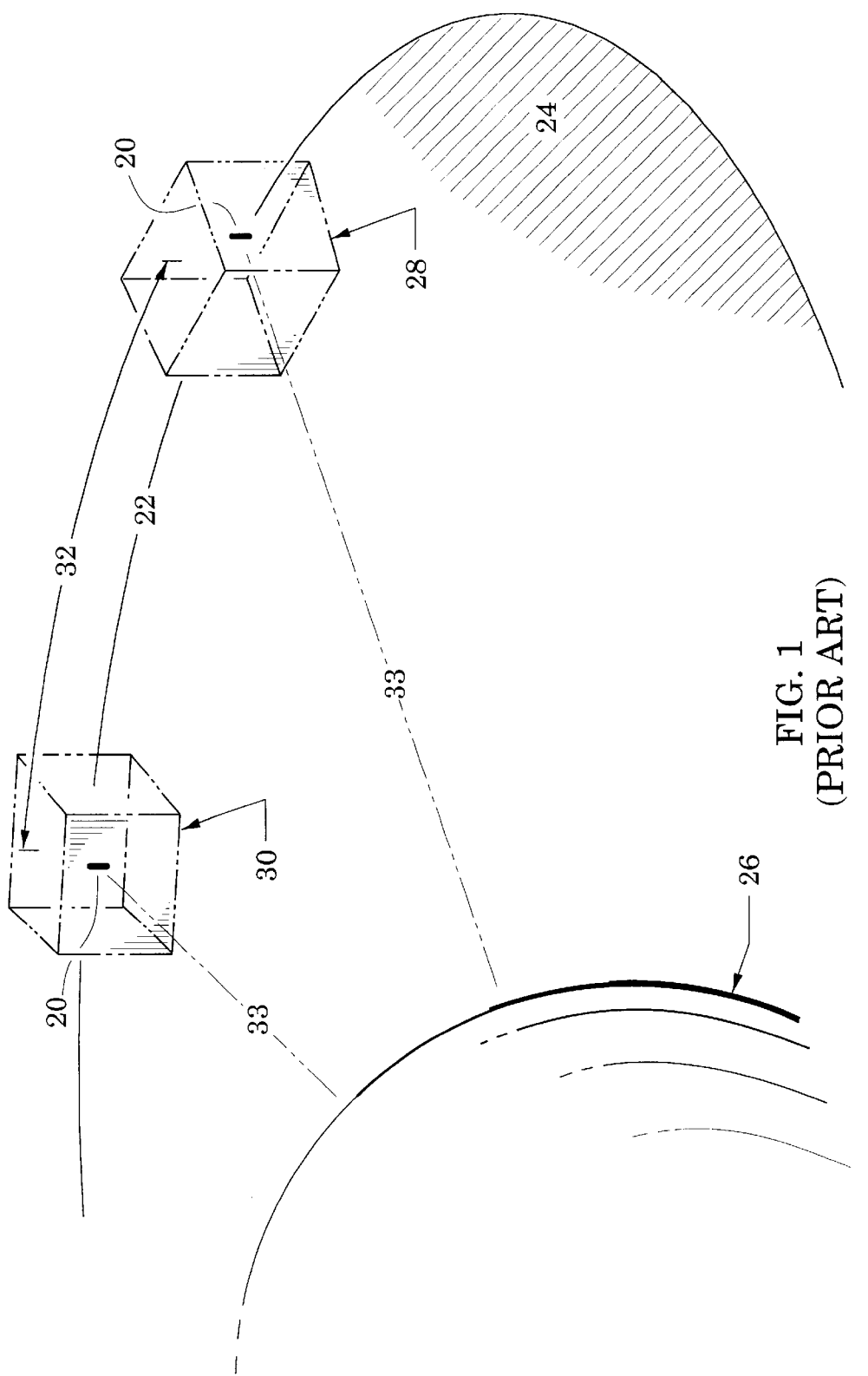
FIG. 1 is a perspective view of a spacecraft, a spacecraft orbital plane and initial and subsequent station-keeping boxes that are longitudinally-spaced along the orbital plane.

In an exemplary station change that requires $T_d$ days to complete, the spacecraft (40 in FIGS. 2, 3A and 3B) is repositioned ΔL in longitude from the station-keeping box 28 of FIG. 1 to the station-keeping box 30. In this repositioning maneuver, the E thruster is initially fired for $T_d/2$ days and subsequently, the W thruster is fired for $T_d/2$ days.

The deceleration due to the E thruster decreases the spacecraft's velocity which causes the spacecraft's orbit to reduce. Because of the smaller orbit, the spacecraft drifts eastward in longitude. Subsequently, the acceleration due to the W thruster increases the spacecraft's velocity and the spacecraft's orbit increases until it is again the size of a synchronous orbit. After the $T_d$ period, the spacecraft is thus returned to a synchronous orbit but has drifted ΔL in longitude to occupy the station-keeping box 30.

In actual practice, the station-changing maneuver may need to be time shared with other thruster duties because the spacecraft's power capabilities may not permit more than one thruster to be fired at any given time. For example, the NE, SE, NW and SW thrusters might be assigned a total of 3 hours/day for station keeping purposes and the E and W thrusters would then be available 21 hours/day for the station-changing maneuver. In this example, the E and W thrusters are available for a fraction f of each day equal to ⅞. In addition, the thrust force F of the E and W thrusters is tangentially reduced (as previously described) by (sin ϕ)(sin α). Therefore, the tangential acceleration $A_t$ (or deceleration) imparted to the spacecraft is $$A_t = \frac{F(\sin\phi \cdot \sin\alpha)f}{M} \text{ (meter/second}^2\text{)} \quad (1)$$

and the longitudinal change ΔL is $$\Delta L = \frac{540\pi A_t T_d^2}{\omega_e V_s} \text{ (degrees)} \quad (2)$$

wherein $\omega_e$ is the earth rotation rate of $0.7292 \times 10^{-4}$ radians/second and $V_d$ is the velocity 3074.66 meters/second of a synchronous spacecraft.

Figure 5:
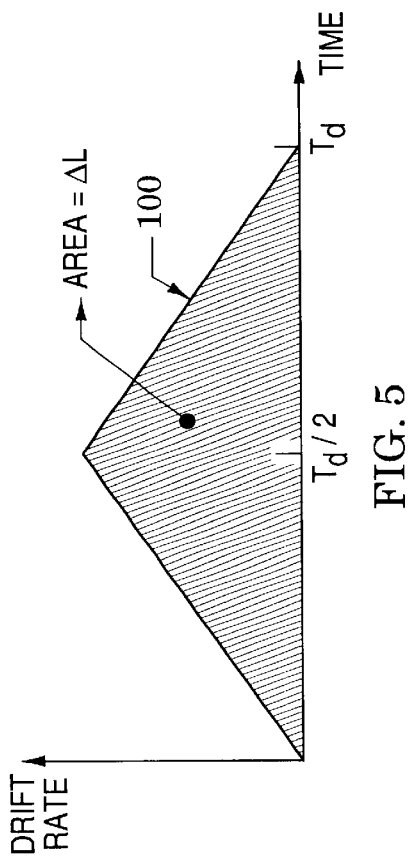
FIG. 5 is a plot of drift rate in an exemplary station-changing maneuver with the thruster system of FIGS. 2, 3A and 3B.

The spacecraft's drift rate is graphically shown as the plot 100 in FIG. 5 which illustrates a linearly-increasing drift rate for the initial $T_d/2$ days when the E thruster is fired a fraction f of each day and a linearly-decreasing drift rate for the subsequent $T_d/2$ days when the W thruster is fired. The longitude change ΔL given by equation (2) represents the area under the drift rate plot 100.

In an exemplary thruster system in which f=⅞ and the polar angle ϕ and slew angle α of the E and W thrusters are respectively 90° and 45°, the terms (sin ϕ)(sin α)f of equation (1) reduces to ~0.62. If F is 0.08 newtons and M is 2800 kilograms, then equation (2) yields a longitude change ΔL of ~121 degrees for a $T_d$ period of 30 days.

Maximum reliability of the thruster system 60 of FIGS. 2, 3A and 3B would be realized by structuring the power supply system (50 in FIG. 3B) to comprise independent power supplies for each thruster. Because weight and space are severely-limited spacecraft assets, the power supply system is, however, preferably structured to couple a first power supply to the E and W thrusters, a second power supply to a first diagonal pair of NE and SW thrusters and a third power supply to a second diagonal pair of SE and NW thrusters.

A first failure mode occurs if either the E and W thrusters or their common power supply fail. In this failure mode, the NE, SE, NW and SW thrusters can effect the station-changing maneuvers (in addition to their station-keeping duties) because they are capable of significant tangential thrust. In an eastward station change that requires $T_d$ days to complete, the NE and SE thrusters may be simultaneously fired during the initial $T_d/2$ days and the NW and SW thrusters would then be simultaneously fired during the final $T_d/2$ days. Although these thrusters are capable of less tangential thrust than the failed E and W thrusters, they compensate for this thrust reduction when they are fired in pairs.

In an exemplary thruster system, the polar angle ϕ and slew angle α of the NE, SE, NW and SW thrusters are respectively 55° and 45°. Although two thrusters are now simultaneously firing in a station-changing maneuver, they are more likely (because their polar angle is reduced from that of the E and W thrusters) to have plume impingement problems with spacecraft structure (e.g., the solar wing concentrators 49 of FIGS. 2, 3A and 3B) for at least a portion of each day.

Accordingly, their daily firing fraction f must be reduced to avoid the damage that plume impingement may cause to such structures. In an exemplary spacecraft, 3 hours/day might be assigned to station keeping and 8 hours/day not available because of plume impingement. In this spacecraft, 13 out of 24 hours could be assigned to station changing so that the firing fraction f is reduced to 0.54. For this example, equations (1) and (2) give a longitude change ΔL in the first failure mode of ~122 degrees for a $T_d$ period of 30 days. In different spacecraft embodiments, plume impingement will not be a concern and, accordingly, the firing fraction f can be increased and the $T_d$ period reduced.

In some spacecraft, power limitations may not permit simultaneous firing of the thrusters of each diagonal thruster pair. In this case and if plume impingement is not a problem so that the firing fraction is maintained at 0.875, equation (1) states that a longitude change ΔL of ~99 degrees can be realized with a time period $T_d$ of 30 days.

A second failure mode occurs if one of the diagonal pairs or their common power supply fail. In this failure mode, for example, only the E and W thrusters and the first diagonal pair of SE and NW thrusters are functional. In this failure mode, station changing is effected with the E and W thrusters and the second diagonal pair of SE and NW thrusters can still effect station keeping.

A third failure mode occurs when one thruster of each diagonal pair fails. For example, failure of the NE and SE thrusters would leave only the E, W, NW and SW thrusters functional. In this failure mode, station changing is effected with the E and W thrusters and station keeping is effected with the E thruster and the NW and SW thrusters.

In FIG. 2, the thrusters of the thruster system 60 are all directed through the spacecraft's center of mass 98. When the thrusters effect the above-described station-changing maneuvers, they do not, therefore, disturb the spacecraft's service attitude. This is a significant feature of the present invention because station changes are realized with no loss of the spacecraft's service time. A spacecraft's center of mass, however, moves during its service life because of various effects (e.g., rotation of solar wings and use of thruster fuel such as liquid xenon). Accordingly, the thrusters of the invention are preferably gimbaled so that they can track the center of mass as it changes.

Many spacecraft employ momentum wheels that can vary their angular velocity and, thereby, induce torques in the spacecraft. These induced torques are arranged to maintain the spacecraft in its service attitude (e.g., with its communication antennas directed along the boresight 33 of FIG. 1 at service areas). Periodically, the momentum wheels reach their rated maximum angular velocity and the velocity must then be reduced so that they can continue to control the spacecraft attitude.

Because of their gimbal structure, the invention's thrusters can be intentionally directed away from the center of mass (as indicated in FIG. 2 by the direction 99 of the SE thruster) to thereby induce torques in the spacecraft which are nulled by offsetting torques generated by the momentum wheels. The induced torques are arranged so that the offsetting torques require velocity reduction in the momentum wheels and, accordingly, their momentum is "dumped".

FIGS. 2, 3A and 3B have illustrated a thruster system 60 whose thrusters have all been rotated by slew angles cc from the anti-nadir portion 96 of the yaw axis. The invention also includes equally-effective thruster system embodiments in which the thrusters are rotated by slew angles α from the nadir portion of the yaw axis. Essentially, the thruster system is mirrored about the roll-pitch plane in this thruster embodiment. In an example of this mirrored embodiment, FIG. 3B shows the NE thruster 64 and NW thruster 65 mirrored to broken-line positions 64M and 65M.

Thruster systems have been described which are particularly suited for effecting spacecraft station changing, station keeping and momentum dumping while maintaining a service attitude of the spacecraft so that its service is not interrupted. As described above, the systems generate significant tangential thrust components so that rapid station changing is realized. The systems are especially suited for station changing of spacecraft in which power capability precludes firing of more than one thruster at a time. As also described, the systems can still realize station changing, station keeping and momentum dumping in the event of a variety of failure modes. Although these systems can be realized with various thruster types, they are particularly suited for ion thrusters.

The preferred embodiments of the invention described herein are exemplary and numerous modifications, dimensional variations and rearrangements can be readily envisioned to achieve an equivalent result, all of which are intended to be embraced within the scope of the appended claims.

I claim:

1. A thruster system that facilitates station changing, station keeping and momentum dumping for a spacecraft when it is in an orbital plane with its yaw axis directed substantially at the earth, its roll axis directed substantially along the spacecraft's velocity vector and its pitch axis directed substantially normal to said orbital plane, the system comprising:
   a northeast (NE) thruster that is tilted southward from said pitch axis by a NE polar angle that is less than 80° and rotated eastward from said yaw axis by a NE slew angle that is less than 80°;
   a southeast (SE) thruster that is tilted northward from said pitch axis by a SE polar angle that is less,than 80° and rotated eastward from said yaw axis by a SE slew angle that is less than 80°;
   an east (E) thruster that is tilted southward from said pitch axis by an E polar angle that is sufficient to position said E thruster between said NE and SE thrusters and rotated eastward from said yaw axis by an E slew angle that is less than 80°;
   a northwest (NW) thruster that is tilted southward from said pitch axis by a NW polar angle that is less than 80° and rotated westward from said yaw axis by a NW slew angle that is less than 80°;
   a southwest (SW) thruster that is tilted northward from said pitch axis by a SW polar angle that is less than 80° and rotated westward from said yaw axis by a SW slew angle that is less than 80°; and
   a west (W) thruster that is tilted southward from said pitch axis by a W polar angle that is sufficient to position said W thruster between said NW and SW thrusters and rotated westward from said yaw axis by a W slew angle that is less than 80°.

2. The thruster system of claim 1, wherein all of said slew angles are rotated from an anti-nadir portion of said yaw axis.

3. The thruster system of claim 1, wherein all of said slew angles are rotated from a nadir portion of said yaw axis.

4. The thruster system of claim 1, wherein said NE, SE, NW and SW polar angles are between 40° and 65°.

5. The thruster system of claim 1, wherein said NE, SE, NW and SW polar angles are substantially equal.

6. The thruster system of claim 5, wherein said E and W polar angles are substantially 90°.

7. The thruster system of claim 1, wherein said NE, SE, E, NW, SW and W slew angles are between 30° and 50° and said E and W slew angles are between 30° and 90°.

8. The thruster system of claim 1, wherein said NE, SE, NW and SW slew angles are substantially equal.

9. The thruster system of claim 1, wherein said spacecraft has a center of mass and all of said thrusters are oriented at said center of mass.

10. The thruster system of claim 1, wherein said spacecraft has a center of mass and at least one of said thrusters is configured to be swung away from said center of mass to thereby generate a torque in said spacecraft.

11. A thruster system that facilitates station changing, station keeping and momentum dumping for a spacecraft when it is in an orbital plane with its yaw axis directed substantially at the earth, its roll axis directed substantially along the spacecraft's velocity vector and its pitch axis directed substantially normal to said orbital plane, the system comprising:
   a northeast (NE) thruster that is tilted southward from said pitch axis by a NE polar angle that is between 40° and 65° and rotated eastward from said yaw axis by a NE slew angle that between 30° and 50°;
   a southeast (SE) thruster that is tilted northward from said pitch axis by a SE polar angle that is is between 40° and 65° and rotated eastward from said yaw axis by a SE slew angle that is between 30° and 50°;
   an east (E) thruster that is tilted southward from said pitch axis by an E polar angle that is substantially 90° and rotated eastward from said yaw axis by an E slew angle that is between 30° and 90°;
   a northwest (NW) thruster that is tilted southward from said pitch axis by a NW polar angle that is between 40° and 65° and rotated westward from said yaw axis by a NW slew angle that is between 30° and 60°;
   a southwest (SW) thruster that is tilted northward from said pitch axis by a SW polar angle that is between 40° and 65° and rotated westward from said yaw axis by a SW slew angle that is between 30° and 50°; and
   a west (W) thruster that is tilted southward from said pitch axis by a W polar angle that is substantially 90° and rotated westward from said yaw axis by a W slew angle that is between 30° and 50°.

12. The thruster system of claim 11, wherein all of said slew angles are rotated from an anti-nadir portion of said yaw axis.

13. The thruster system of claim 11, wherein all of said slew angles are rotated from a nadir portion of said yaw axis.

14. The thruster system of claim 11, wherein:
   said NE, SE, NW and SW polar angles are substantially equal; and
   said NE, SE, NW and SW slew angles are substantially equal.

15. The thruster system of claim 11, wherein said spacecraft has a center of mass and all of said thrusters are oriented at said center of mass.

16. The thruster system of claim 11, wherein said spacecraft has a center of mass and at least one of said thrusters is configured to be swung away from said center of mass to thereby generate a torque in said spacecraft.

17. A spacecraft that facilitates station changing, station keeping and momentum dumping when it is in an orbital plane with its yaw axis directed substantially at the earth, its roll axis directed substantially along the spacecraft's velocity vector and its pitch axis directed substantially normal to said orbital plane, the spacecraft comprising:
   a spacecraft body;
   a set of thrusters that are coupled to said body and that include:
   a) a northeast (NE) thruster that is tilted southward from said pitch axis by a NE polar angle that is less than 80° and rotated eastward from said yaw axis by a NE slew angle that is less than 80°;
   b) a southeast (SE) thruster that is tilted northward from said pitch axis by a SE polar angle that is less than 80° and rotated eastward from said yaw axis by a SE slew angle that is less than 80°;
   c) an east (E) thruster that is tilted southward from said pitch axis by an E polar angle that is sufficient to position said E thruster between said NE and SE thrusters and rotated eastward from said yaw axis by an E slew angle that is less than 80°;
   d) a northwest (NW) thruster that is tilted southward from said pitch axis by a NW polar angle that is less than 80° and rotated westward from said yaw axis by a NW slew angle that is less than 80°;
   e) a southwest (SW) thruster that is tilted northward from said pitch axis by a SW polar angle that is less than 80° and rotated westward from said yaw axis by a SW slew angle that is less than 80°; and
   f) a west (W) thruster that is tilted southward from said pitch axis by a W polar angle that is sufficient to position said W thruster between said NW and SW thrusters and rotated westward from said yaw axis by a W slew angle that is less than 80°.

18. The spacecraft of claim 17, wherein all of said slew angles are rotated from an anti-nadir portion of said yaw axis.

19. The spacecraft of claim 17, wherein all of said slew angles are rotated from a nadir portion of said yaw axis.

20. The spacecraft of claim 17, wherein said NE, SE, NW and SW polar angles are between 40° and 65°.

21. The spacecraft of claim 17, wherein said NE, SE, NW and SW polar angles are substantially equal.

22. The spacecraft of claim 21, wherein said E and W polar angles are substantially 90°.

23. The thruster system of claim 21, wherein said NE, SE, E, NW, SW and W slew angles are between 30° and 50° and said E and W slew angles are between 30° and 90°.

24. The spacecraft of claim 17, wherein said NE, SE, NW and SW slew angles are substantially equal.

25. The spacecraft of claim 17, wherein said spacecraft has a center of mass and all of said thrusters are oriented at said center of mass.

26. The spacecraft of claim 17, wherein said spacecraft has a center of mass and at least one of said thrusters is configured to be swung away from said center of mass to thereby generate a torque in said spacecraft.

27. The spacecraft of claim 17, further including:
   at least one solar wing coupled to said body and configured to generate an electrical current in response to sun light;
   a first power supply connected to supply power to said NE and SW thrusters in response to said current;
   a second power supply connected to supply power to said E and W thrusters in response to said current; and
   a third power supply connected to supply power to said NW and SE thrusters in response to said current.

28. The spacecraft of claim 17, further including:
   at least one gyroscope coupled to said body to generate rotation signals;
   at least one attitude sensor coupled to said body to generate attitude signals; and
   a controller that receives said rotation and attitude signals and, in response, couples thrust command signals to said set of thrusters.

* * * * *